United States Patent
Yoshida et al.

(10) Patent No.: US 9,856,906 B2
(45) Date of Patent: Jan. 2, 2018

(54) HOLLOW SHAFT AND CONSTANT VELOCITY UNIVERSAL JOINT

(75) Inventors: Kazuhiko Yoshida, Shizuoka (JP); Hiroki Mukai, Shizuoka (JP); Hirokazu Ooba, Shizuoka (JP)

(73) Assignee: NTN CORPORATION, Osaka (JP)

( * ) Notice: Subject to any disclaimer, the term of this patent is extended or adjusted under 35 U.S.C. 154(b) by 390 days.

(21) Appl. No.: 13/500,140

(22) PCT Filed: Oct. 1, 2010

(86) PCT No.: PCT/JP2010/067229
§ 371 (c)(1),
(2), (4) Date: Apr. 4, 2012

(87) PCT Pub. No.: WO2011/052342
PCT Pub. Date: May 5, 2011

(65) Prior Publication Data
US 2012/0211125 A1    Aug. 23, 2012

(30) Foreign Application Priority Data

Oct. 29, 2009   (JP) ................................. 2009-249017

(51) Int. Cl.
*F16D 3/16*   (2006.01)
*F16C 3/02*   (2006.01)
(Continued)

(52) U.S. Cl.
CPC ................. *F16C 3/02* (2013.01); *F16D 3/20* (2013.01); *F16D 3/2055* (2013.01); *F16D 3/223* (2013.01);
(Continued)

(58) Field of Classification Search
USPC ........................................................ 148/440
See application file for complete search history.

(56) References Cited

U.S. PATENT DOCUMENTS 8,273,188 B2 * 9/2012 Yoshida .................... 148/226
2002/0017343 A1 * 2/2002 Yoshida et al. ............ 148/328
(Continued)

FOREIGN PATENT DOCUMENTS

CN    1989351    6/2007
EP    2 140 950  1/2010
(Continued)

OTHER PUBLICATIONS

International Search Report issued Dec. 28, 2010 in International (PCT) Application No. PCT/JP2010/067229.
(Continued)

*Primary Examiner* — Jenny Wu
(74) *Attorney, Agent, or Firm* — Wenderoth, Lind & Ponack, L.L.P.

(57) ABSTRACT

A hollow shaft, which is usable with a constant velocity universal joint, has an increased static torsional strength and torsional fatigue strength of a small diameter portion (small diameter portion having a smooth outer peripheral surface) formed near a spline at an end portion of the hollow shaft, and has a reduced manufacturing cost. The hollow shaft is molded by plastic working from a tubular blank, and subjected to quench hardening treatment. The quench hardening treatment includes carburizing and quenching treatment. The hollow shaft includes a softened section formed in a part of the hollow shaft by local heating treatment after carrying out the carburizing and quenching treatment.

12 Claims, 6 Drawing Sheets

(51) Int. Cl.
*F16D 3/20* (2006.01)
*F16D 3/205* (2006.01)
*F16D 3/223* (2011.01)
*F16D 3/202* (2006.01)

(52) U.S. Cl.
CPC .. *F16D 2003/2026* (2013.01); *F16D 2250/00* (2013.01)

(56) References Cited

U.S. PATENT DOCUMENTS

| | | | |
|---|---|---|---|
| 2004/0063506 A1* | 4/2004 | Ichikawa et al. | 464/182 |
| 2004/0219051 A1 | 11/2004 | Sonti et al. | |
| 2005/0026705 A1* | 2/2005 | Watanabe et al. | 464/111 |
| 2010/0295256 A1* | 11/2010 | Nakajima | F16D 3/223 277/634 |
| 2011/0163525 A1* | 7/2011 | Aoki | B62D 1/16 280/779 |

FOREIGN PATENT DOCUMENTS

| | | |
|---|---|---|
| JP | 2004-340221 | 12/2004 |
| JP | 2005-030569 | 2/2005 |
| JP | 2005030569 A * | 2/2005 |
| JP | 2005-164016 | 6/2005 |
| JP | 2006-002809 | 1/2006 |
| JP | 2007-075824 | 3/2007 |
| JP | 2007-247847 | 9/2007 |
| JP | 2007247847 A * | 9/2007 |
| WO | WO 2008105209 A1 * | 9/2008 |
| WO | 2008/123363 | 10/2008 |

OTHER PUBLICATIONS

International Preliminary Report on Patentability and Written Opinion of the International Searching Authority issued Jun. 21, 2012 in International (PCT) Application No. PCT/JP2010/067229.

Chinese Office Action issued Sep. 9, 2014 in corresponding Chinese Patent Application 201080048490.2 with English translation.

Chinese Office Action issued Jan. 16, 2014 in corresponding Chinese Patent Application No. 201080048490.2 with English translation.

* cited by examiner

HOLLOW SHAFT AND CONSTANT VELOCITY UNIVERSAL JOINT

TECHNICAL FIELD

The present invention relates to a hollow shaft, in particular, a hollow shaft to be used for a drive shaft or a propeller shaft forming a part of a power transmission system of an automobile, and relates to a constant velocity universal joint using the hollow shaft.

BACKGROUND ART

Shafts forming a power transmission system of an automobile include a drive shaft for connecting a final reduction gear and a wheel bearing device to each other, and a propeller shaft for transmitting a power from a transmission to a final reduction gear. At a shaft end portion of each of the shafts, a spline or the like serving as a coupling element is provided. In terms of basic structure, intermediate shafts for the drive shaft are roughly classified into a solid shaft fabricated from a solid bar stock, and a hollow shaft fabricated from a bar stock or a steel tube by plastic working and a joining process.

Conventionally, the solid shaft has been normally used. However, in recent years, there is a need for functional improvements such as a reduction in weight of a suspension system of an automobile and an improvement of torsional rigidity and NVH characteristics, and hence the hollow shaft is being increasingly used.

As an integral type hollow shaft, for example, there are used shafts molded by swaging that is a process of reducing a diameter of a steel tube by hammering in a diameter direction at high speed while rotating the steel tube about an axis thereof, or by press working that is a process of reducing the diameter of the steel tube by pushing the steel tube into a die in an axial direction thereof. In the integral type hollow shaft thus fabricated by plastic working such as swaging, a blank plastically flows radially inward when the steel tube is reduced in diameter, and hence working wrinkles are likely to remain in the radially inner surface (inner surface). The working wrinkles in the radially inner surface may act as a starting point of a fracture when torsional torque is applied to the shaft. Thus, there is a fear in that, when this region starts to fracture, a static torsional strength and a torsional fatigue strength are lowered.

In this context, conventionally, various hollow shafts increased in strength have been proposed (Patent Literature 1 to Patent Literature 3). Patent Literature 1 proposes the following shaft. Specifically, the shaft has the structure that the opening end surface of the cylindrical portion of the shaft forming member is joined to the opening end surface of another shaft forming member, thereby increasing the joining area. This structure increases the strength of the joining portion. Patent Literature 2 proposes the following shaft. Specifically, the part of the shaft, in which the spline is to be provided, is molded by plastic working before being subjected to splining. The inner diameter of the part after the molding is smaller than the inner diameter of the part before the molding, and the thickness of the part is substantially equal before and after the molding. Patent Literature 3 proposes the shaft in which wrinkles resulting from plastic working are removed by cutting and grinding before carrying out quench hardening treatment.

CITATION LIST

Patent Literature

Patent Literature 1: JP 2005-164016 A
Patent Literature 2: JP 2007-75824 A
Patent Literature 3: JP 2007-247847 A

SUMMARY OF INVENTION

Technical Problems

In Patent Literature 1, the flange portions each having a large outer diameter are formed at the joining portion, and thus the strength of the joining portion is increased. However, except in the flange portions increased in diameter, the torsional strength and the like are not changed, and hence the torsional strength of the entire shaft cannot be increased. In addition, the flange portions each having the large outer diameter are formed, and hence the shaft is increased in size.

Further, in Patent Literature 2, the lower diameter of the spline can be increased in strength, but another region, in particular, the small diameter portion having the smooth radially outer surface and being formed near the spline cannot be increased in strength.

Still further, in Patent Literature 3, through removal of the working wrinkles in the radially inner surface, a static torsional strength and a torsional strength are intended to be ensured. However, it is difficult to detect all the working wrinkles in the radially inner surface, and hence it is difficult to remove all the working wrinkles. In addition, a step of removing the working wrinkles is required, which leads to an increased length of the entire working step and a cost increase.

By the way, for increasing the strength, the intermediate shafts as described above are subjected to quenching. As quenching, induction quenching is often used. However, the working wrinkles formed in the radially inner surface of the hollow shaft by swaging are too subtle to be detected by touching. When carrying out induction quenching, tensile stress remains inside the hollow shaft to thereby cause development of the working wrinkles, and hence a problem of strength sometimes arises. Accordingly, in recent years, as means for quenching the intermediate shafts of this type, carburizing and quenching is increasingly carried out.

However, in a surface portion of a hardened layer formed by carburizing and quenching, an abnormal surface layer containing an incompletely-quenched portion, an inter-granularly-oxidized portion, and the like is present. The abnormal surface layer is a soft and fragile layer. Accordingly, for conventional carburized products, grinding or the like has been performed on a surface of a quenched layer after carburizing and quenching. In this manner, the abnormal surface layer is removed. However, it is necessary to perform grinding or the like after carburizing and quenching, which leads to poor productivity and a cost increase.

It is therefore an object of the present invention to provide a hollow shaft capable of increasing the static torsional strength and the torsional fatigue strength of a small diameter portion (small diameter portion having a smooth outer peripheral surface) formed near a spline at an end portion of the hollow shaft, and capable of reducing cost, and to provide a constant velocity universal joint using the hollow shaft.

Solution to Problems

According to an exemplary embodiment of the present invention, there is provided a hollow shaft formed by plastic working from a tubular blank, and subjected to quench hardening treatment, the quench hardening treatment including carburizing and quenching treatment, the hollow shaft including a softened portion formed in at least a part of the hollow shaft by local heating treatment after carrying out the carburizing and quenching treatment.

Usually, after carburizing and quenching, a hardened layer has a high carbon concentration and high hardness, and is sometimes embrittled. Therefore, after the carburizing and quenching treatment, the softened portion is formed in the at least the part of the hollow shaft by the local heating treatment, and thus the hollow shaft can be reduced in hardness and imparted with toughness in the softened portion.

It is preferred that the hollow shaft be an integral type hollow shaft including: male splines formed in both end portions of the hollow shaft, respectively; and small diameter portions each having a smooth radially outer surface and being respectively formed near the male splines in the both end portions of the hollow shaft, in which: one of the two small diameter portions is formed as a minimum diameter portion; and the minimum diameter portion is formed into the softened portion obtained by the local heating treatment. In the hollow shaft described above, the minimum diameter portion having the smooth radially outer surface is an easily deformed region. Accordingly, the small diameter portion is formed into the softened portion, and thus a brittle fracture caused by an intergranular fracture is prevented, which is most preferred in increasing the strength of the hollow shaft.

The local heating treatment may be carried out by induction heating treatment. Here, induction heating is a heating method employing a principle of inserting a part necessary to be quenched into a coil through which a high-frequency current flows, and generating Joule heat with an electromagnetic induction action, to thereby heat a conductive substance.

The tubular blank may have a carbon content of from 0.15% to 0.45% (by mass). A portion subjected to the carburizing and quenching treatment may have a surface carbon concentration of from 0.50% to 0.70% (by mass). Further, it is preferred that the small diameter portions formed into the softened portion obtained by the local heating treatment have radially inner surface hardness of from 45 HRC to 55 HRC, and that a depth of an abnormal surface layer after the carburizing and quenching treatment be 5 µm or less.

The hollow shaft may be subjected to induction tempering after the carburizing and quenching treatment, and the softened portion obtained by the local heating treatment may be formed during the induction tempering. It is preferred that the local heating treatment be carried out in liquid. The local heating treatment carried out in the liquid is, for example, heating treatment that is carried out by soaking the shaft in a quenching oil or the like filling a quenching bath, and causing a high frequency current to flow through heating coils connected to a high frequency power source in a state in which the heating coils are outwardly fitted to the shaft.

One end portion of the hollow shaft may be coupled to a fixed type constant velocity universal joint, and one of the small diameter portions on the fixed type constant velocity universal joint side may be formed into the softened portion obtained by the local heating treatment. That is, the softened portion may be provided only on the fixed type constant velocity universal joint side.

One end portion of the hollow shaft may be coupled to a fixed type constant velocity universal joint, and another end portion of the hollow shaft may be coupled to a plunging type constant velocity universal joint.

When Ds represents an outer diameter dimension of another one of the small diameter portions on the plunging type constant velocity universal joint side and Df represents an outer diameter dimension of the one of the small diameter portions on the fixed type constant velocity universal joint side, a ratio (Ds/Df) may range from 1.05 to 1.13.

When the one end portion of the hollow shaft is coupled to the fixed type constant velocity universal joint, and when L' represents an axial length of the minimum diameter portion of the hollow shaft corresponding to the one of the small diameter portions on the fixed type constant velocity universal joint side and Lo represents a length of an interference region which interferes with an outer joint member of the fixed type constant velocity universal joint in a state of forming a high operating angle, a ratio (L'/Lo) may range from 1 to 4.

Advantageous Effects of Invention

According to the hollow shaft of the present invention, the hollow shaft can be reduced in hardness and imparted with toughness in the softened portion, and hence regardless of presence/absence of working wrinkles, the static torsional strength and the torsional fatigue strength of the hollow shaft can be increased. Further, when the small diameter portion is formed into the softened portion, the strength of an easily-deformed region can be increased, and hence the strength as the shaft can be stably obtained. In particular, when the minimum diameter portion is formed into the softened portion, the reliability of the strength stability is increased.

The local heating treatment can be carried out by the high-frequency heating treatment, and hence has many advantages. For example, the high-frequency heating treatment has the following advantages: local heating is possible; heating can be performed in a short period of time, and hence produces less oxidation; quenching strain is less as compared to that of another quenching method; surface hardness is high, and an excellent strength is obtained; selection of a depth of a hardened layer is relatively easy; automation is easy and insertion into a machining line is possible; and the like.

The tubular blank has the carbon content of from 0.15% to 0.45%, and hence good plastic workability and even the higher strength can be obtained. When the carbon content is less than 0.15%, necessary hardness of a core portion after the carburizing and quenching treatment cannot be obtained, which leads to a reduction in strength. When the carbon content exceeds 0.45%, plastic workability of the tubular blank is reduced.

The surface carbon concentration (CP value) at the time of the carburizing and quenching treatment is set to 0.50% to 0.70%, and hence a proper hardness distribution at the time of the carburizing and quenching treatment is easily obtained. When the surface carbon concentration (CP value) is less than 0.50%, stable surface hardness cannot be obtained. When the surface carbon concentration (CP value) exceeds 0.70%, a brittle fracture is likely to occur. Here, the brittle fracture is a fracture involving a significant reduction of plastic deformation.

The small diameter portion formed into the softened portion obtained by the local heating treatment has the radially inner surface hardness of from 45 HRC to 55 HRC, and hence the static torsional strength can be ensured. When the radially inner surface hardness is less than 45 HRC, a yield point is low. When the radially inner surface hardness exceeds 55 HRC, working wrinkles and cracks of flaws generated by plastic working are sharpened, which leads to a reduction in strength.

The depth of the abnormal surface layer after the carburizing and quenching treatment is set to 5 μm or less. This does not lead to a reduction in strength, and does not require carrying out grinding or the like for removing the abnormal surface layer after carburizing and quenching, thereby enabling an improvement of productivity and a cost reduction. In contrast, when the depth of the abnormal surface layer exceeds 5 μm, the abnormal surface layer acts as an origin of the fracture, with the result that the strength is reduced.

If the softened portion obtained by the local heating treatment is simultaneously formed when carrying out induction tempering, as compared to a step of forming the softened portion by the local heating treatment after carrying out induction tempering, it is possible to shorten an operation time period, improve productivity, and reduce cost.

The local heating treatment is carried out in the liquid, and hence a range of a thermally-affected portion can be localized. Thus, it is possible to facilitate control of local heating performed on the small diameter portion, and to effectively prevent softening of a region, such as the spline adjacent to the small diameter portion, which is unnecessary to be subjected to local heating.

When the ratio (Ds/Df) ranges from 1.05 to 1.13, the small diameter portion on the fixed type constant velocity universal joint side is formed as the minimum diameter portion. Accordingly, it is only necessary to carry out local heating only on the minimum diameter portion, which enables a reduction in local heating cost. When the ratio (Ds/Df) is less than 1.05, the small diameter portion on the plunging type constant velocity universal joint side becomes a weakest portion after local heating, which is of no value as a measure. When the ratio (Ds/Df) is more than 1.13, it is difficult to carry out plastic working, which increases manufacturing cost.

When the ratio (L'/Lo) ranges from 1 to 4, a maximum operating angle as the constant velocity universal joint can be ensured. In addition, a region to be subjected to local heating can be set in a relatively small range, which enables easy control and a cost reduction. When the ratio (L'/Lo)<1, the maximum operating angle as the constant velocity universal joint cannot be ensured. When the ratio (L'/Lo)>4, it is difficult to obtain merits of limitation.

According to the constant velocity universal joint of the present invention, the hollow shaft can be increased in static torsional strength and torsional fatigue strength, and can form the constant velocity universal joint capable of stably transmitting torque for a long period of time.

DESCRIPTION OF EMBODIMENTS

Hereinafter, embodiments of the present invention are described with reference to FIG. 1 to FIG. 6.

Figure 1:
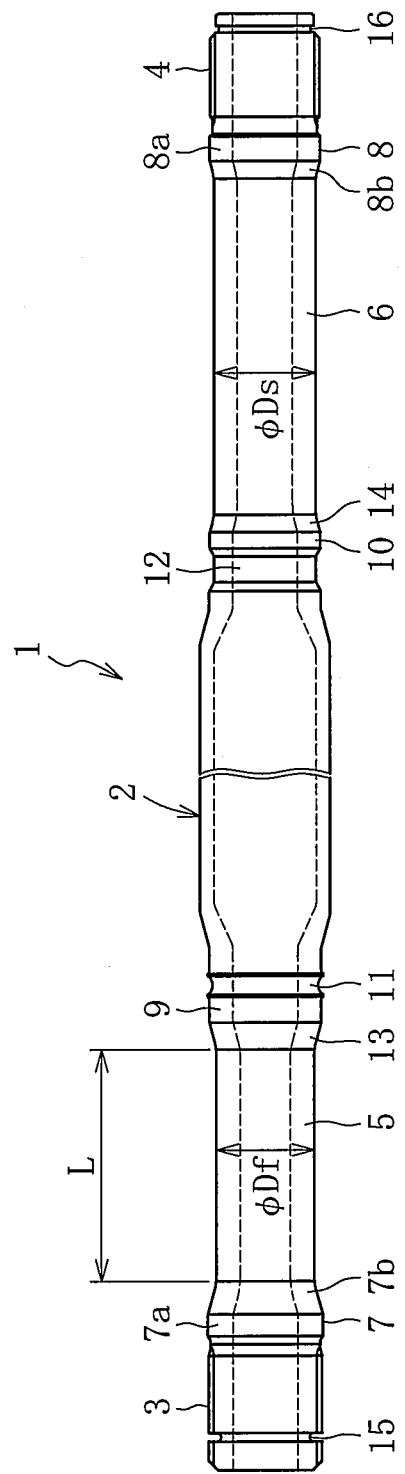
FIG. 1 A front view of a hollow shaft according to a first embodiment of the present invention.

FIG. 1 illustrates a hollow shaft 1 according to a first embodiment of the present invention. The hollow shaft 1 includes a large diameter portion 2 situated at its axial middle portion, splines (male spline portions) 3, 4 respectively situated at its both end portions, and small diameter portions 5, 6 disposed between the large diameter portion 2 and the spline 3 and between the large diameter portion 2 and the spline 4. Further, a spline shoulder portion 7 is provided between the spline 3 and the small diameter portion 5, and a spline shoulder portion 8 is provided between the spline 4 and the small diameter portion 6. Note that, the spline shoulder portion 7 includes a short cylindrical portion 7a and a tapered portion 7b, and the spline shoulder portion 8 includes a short cylindrical portion 8a and a tapered portion 8b.

An intermediate diameter portion 9 is provided between the large diameter portion 2 and the small diameter portion 5, and an intermediate diameter portion 10 is provided between the large diameter portion 2 and the small diameter portion 6. Further, a peripheral groove 11 for mounting a boot is formed in the intermediate diameter portion 9, and a peripheral groove 12 for mounting a boot is formed in the intermediate diameter portion 10, the peripheral grooves 11, 12 being described later. Further, a tapered portion 13 is provided between the intermediate diameter portion 9 and the small diameter portion 5, and a tapered portion 14 is provided between the intermediate diameter portion 10 and the small diameter portion 6. Note that, a fitting groove 15 into which a snap ring is mounted is formed in the spline 3, and a fitting groove 16 into which a snap ring is mounted is formed in the spline 4, the fitting grooves 15, 16 being described later.

Figure 2:
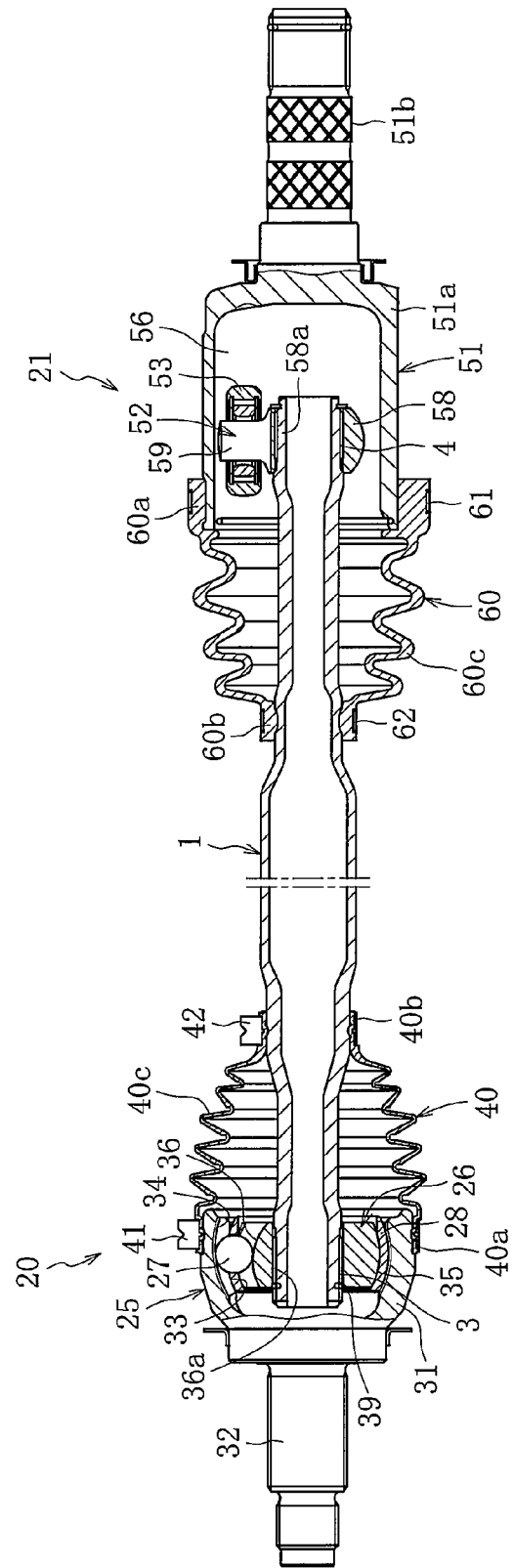
FIG. 2 A cross-sectional view of a drive shaft assembly using the hollow shaft.
Figure 3:
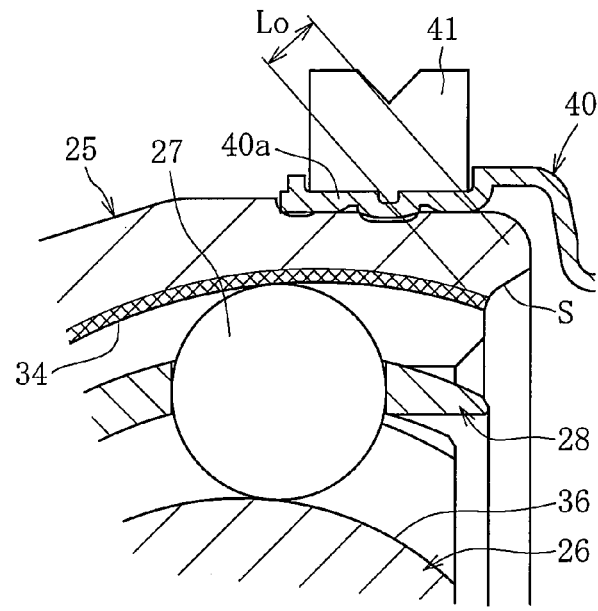
FIG. 3 An enlarged cross-sectional view of a main part of a fixed type constant velocity universal joint of the drive shaft assembly.

By the way, for example, as illustrated in FIG. 2, the hollow shaft 1 is applied to a drive shaft. That is, one end portion of the hollow shaft is coupled to a fixed type constant velocity universal joint 20 through the spline 3, and another end portion thereof is coupled to a plunging type constant velocity universal joint 21 through the spline 4.

Here, as the constant velocity universal joint 20, a Rzeppa type is exemplified, but another fixed type constant velocity universal joint can be adopted, such as an undercut free type including a straight portion at a groove bottom of a ball groove. The constant velocity universal joint 20 includes, as main members, an outer joint member 25, an inner joint member 26, a plurality of balls 27 serving as torque transmitting elements, and a cage 28 for retaining the balls 27.

The outer joint member 25 is made of, for example, a medium carbon steel, such as S53C, containing carbon of 0.50 to 0.55 wt %, and includes a mouth section 31 and a shaft section (stem section) 32. The mouth section 31 has a cup shape opened at one end, and has a spherical inner peripheral surface (inner spherical surface) 33 in which a plurality of ball grooves 34 extending axially are formed equiangularly.

The inner joint member 26 is made of, for example, a medium carbon steel, such as SCr420, containing carbon of 0.17 to 0.23 wt %. The spline 3 situated as the end portion of the shaft 1 is spline-fitted into a spline hole 36a of an axial center portion of the inner joint member 26, and thus the inner joint member 26 is coupled to the shaft 1 so as to enable torque transmission therebetween. A snap ring 39 mounted on the end portion of the shaft 1 prevents the shaft 1 from slipping off from the inner joint member 26. The inner joint member 26 has a spherical outer peripheral surface (outer spherical surface) 35 in which a plurality of ball grooves 36 extending axially are formed equiangularly.

The ball grooves 34 of the outer joint member 25 and the ball grooves 36 of the inner joint member 26 are paired with each other, and each of the balls 27 is rollably incorporated in a ball track formed by each pair of the ball grooves 34, 36. The balls 27 transmit torque while being interposed between the ball grooves 34 of the outer joint member 25 and the ball grooves 36 of the inner joint member 26. All the balls 27 are retained by the cage 28 in the same plane. The cage 28 is interposed in a spherical-surface contact state between the outer joint member 25 and the inner joint member 26. A spherical outer peripheral surface of the cage 28 is held in contact with the inner spherical surface 33 of the outer joint member 25, and a spherical inner peripheral surface of the cage 28 is held in contact with the outer spherical surface 35 of the inner joint member 26.

In order to prevent leakage of a lubricant filling an inside of the constant velocity universal joint, and to prevent intrusion of foreign matters from an outside of the constant velocity universal joint, an opening portion of the mouth section 31 is sealed with a boot 40. The boot 40 includes a large diameter portion 40a, a small diameter portion 40b, and a bellows portion 40c coupling the large diameter portion 40a and the small diameter portion 40b to each other. The large diameter portion 40a is fitted to the opening portion of the mouth section 31 and fastened by a boot band 41. The small diameter portion 40b is fitted to a boot mounting portion of the shaft 1 (region of the intermediate diameter portion 9 in which the peripheral groove 11 for mounting a boot is formed) and fastened by a boot band 42.

Here, as the plunging type constant velocity universal joint 21, a tripod type is exemplified, but another plunging type constant velocity universal joint such as a double offset type can be adopted. The constant velocity universal joint 21 includes, as main components, an outer joint member 51, a trunnion 52 serving as an inner joint member, and rollers 53 serving as torque transmitting elements.

The outer joint member 51 is made of, for example, a medium carbon steel, such as SCr420, containing carbon of 0.17 to 0.23 wt %, and includes a mouth section 51a and a stem section 51b. The stem section 51b is coupled to an output shaft of a final reduction gear so as to enable torque transmission therebetween. The mouth section 51a has a cup shape opened at one end, and has track grooves 56 which extend axially and are formed at circumferentially trisected positions of an inner periphery of the mouth section 51a. Thus, a lateral cross-sectional shape of the mouth section 51a is corollaceous.

The trunnion 52 includes a boss 58 and leg shafts 59, and is made of, for example, a medium carbon steel, such as SCr420, containing carbon of 0.17 to 0.23 wt %. The spline 4 of the shaft 1 is coupled into a spline hole 58a of the boss 58 so as to enable torque transmission therebetween. The leg shafts 59 protrude radially from circumferentially trisected positions of the boss 58. On each of the leg shafts 59, the roller 53 is supported so as to freely rotate.

Also in this case, a boot 60 is fitted to seal an opening portion of the outer joint member 51. This prevents leakage of the lubricant filling the inside of the constant velocity universal joint, and prevents intrusion of foreign matters from the outside of the constant velocity universal joint. The boot 60 includes a large diameter portion 60a, a small diameter portion 60b, and a bellows portion 60c formed between the large diameter portion 60a and the small diameter portion 60b. The large diameter portion 60a is fitted to an opening end portion of the mouth section 51a and fastened by a boot band 61, and the small diameter portion 60b is fitted to the boot mounting portion of the shaft 1 (region of the intermediate diameter portion 10 in which the peripheral groove 12 for mounting a boot is formed) and fastened by a boot band 62.

When Ds represents an outer diameter dimension of the small diameter portion 6 on the plunging type constant velocity universal joint 21 side (see FIG. 1) and Df represents an outer diameter dimension of the small diameter portion 5 on the fixed type constant velocity universal joint 20 side (see FIG. 1), the hollow shaft 1 has a ratio (Ds/Df) ranging from 1.05 to 1.13. Thus, the small diameter portion 5 on the fixed type constant velocity universal joint 20 side is a minimum diameter portion (minimum smooth portion).

By the way, for forming the hollow shaft 1, first, by plastic working such as swaging that is a process of reducing a diameter of a steel tube (tubular blank) by hammering in a diameter direction at high speed while rotating the steel tube about an axis thereof, the steel tube is molded into a hollow body with no splines 3, 4 at its both end portions. Then, the splines 3, 4 are formed at the end portions of the hollow body by component rolling, press working, or the like.

Next, a hardened layer is formed over substantially an entire length and an entire periphery of the hollow shaft 1 by carburizing and quenching. Here, carburizing and quenching is a method of infiltrating/diffusing carbon into a surface of a low-carbon material, and then carrying out quenching. By the way, the tubular blank has a carbon content of from 0.15% to 0.45%, and has a surface carbon concentration (CP value) of from 0.50% to 0.70% at the time of carburizing and quenching treatment.

Figure 6:
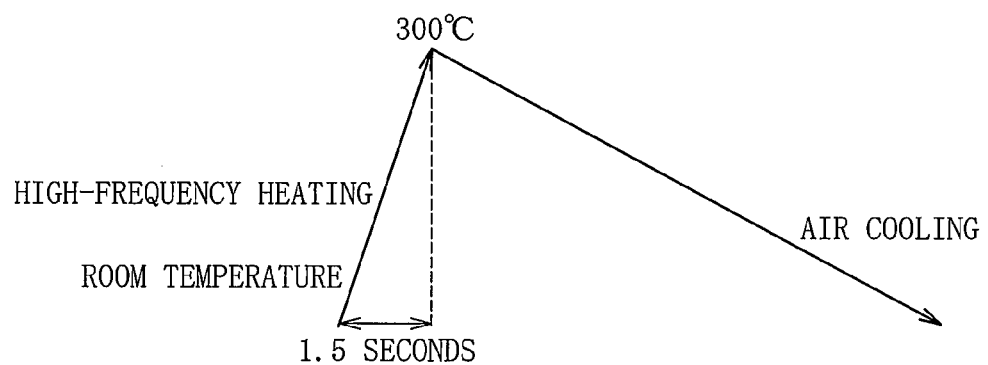
FIG. 6 A graph illustrating a condition of high-frequency heating treatment carried out as the local heating treatment.

Then, a softened portion M (see FIG. 4 and FIG. 5) is formed in a part of the tubular blank by local heating treatment. In this case, the softened portion M is the small diameter portion 5 on the fixed type constant velocity universal joint 20 side, that is, the minimum diameter portion having a smooth outer peripheral surface. Induction heating is carried out as the local heating treatment. In the hollow shaft 1 left subjected to carburizing and quenching, the small diameter portion (minimum smooth portion) 5 has high hardness, and is sometimes embrittled. Accordingly, local heating is carried out on the small diameter portion (minimum smooth portion) 5, and thus the small diameter portion 5 is reduced in hardness and imparted with ductility. The induction heating is a heating method employing a principle of inserting a part necessary to be quenched into a coil through which a high-frequency current flows, generating Joule heat with an electromagnetic induction action, and heating a conductive substance. For example, as illustrated in FIG. 6, the induction heating is carried out by heating a substance in a room temperature state to about 300° C. in about 1.5 seconds, stopping high-frequency heating in this state, and then reducing a temperature of the substance to room temperature by air cooling.

Figure 4:
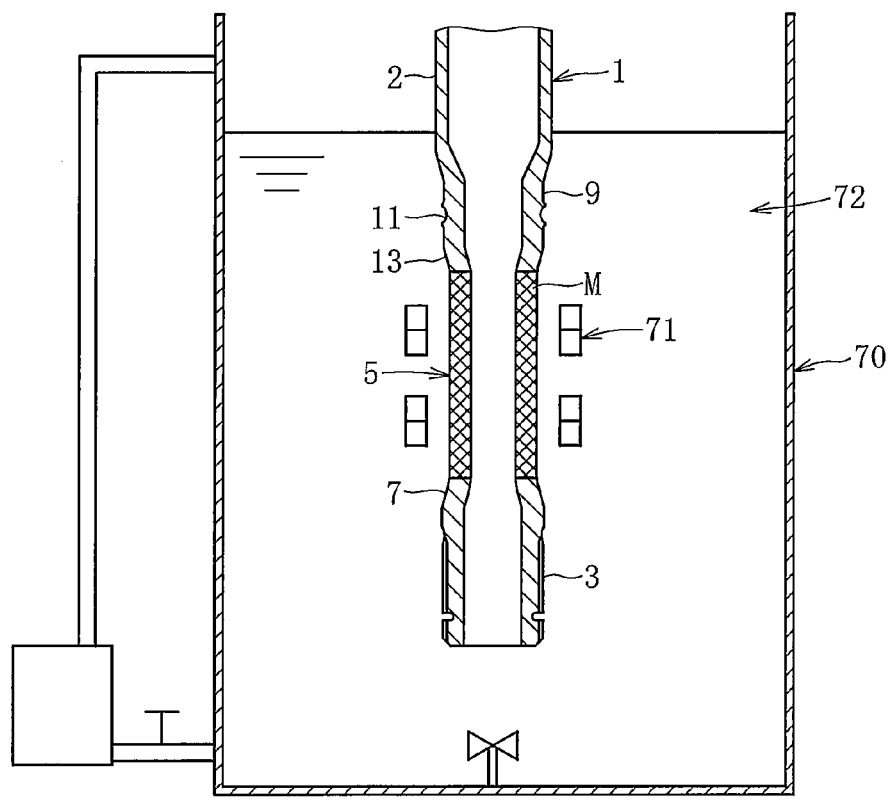
FIG. 4 A simplified schematic diagram illustrating a state in which local heating treatment is carried out in liquid.
Figure 5:
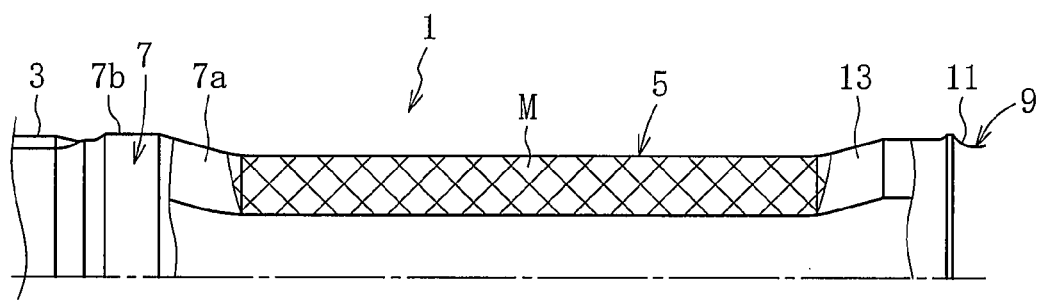
FIG. 5 An enlarged cross-sectional view of a main part of the hollow shaft after the local heating treatment.

It is preferred that the induction heating be carried out in liquid as illustrated in FIG. 4. The local heating treatment carried out in the liquid includes a quenching bath 70 filled with oil 72 or the like, and heating coils 71 connected to a high frequency power source (not shown). That is, the local heating treatment is heating treatment that is carried out by soaking the shaft 1 in the oil 72 or the like filling the quenching bath 70, and causing a high frequency current to flow through the heating coils 71 connected to the high frequency power source in a state in which the heating coils 71 are outwardly fitted to the shaft 1. Note that, a cross-hatched portion illustrated in FIG. 4 or FIG. 5 indicates the softened portion M formed by induction heating treatment carried out in the liquid. The softened portion M thus formed has radially inner surface hardness of from 45 HRC to 55 HRC. Note that, as treatment conditions (treatment conditions such as a heating temperature, a heating time period, and a cooling time period) of the local heating treatment carried out in the liquid, there can be selected various conditions satisfying that the softened portion M has the radially inner surface hardness of from 45 HRC to 55 HRC.

Further, a depth of an abnormal surface layer after the carburizing and quenching treatment is set to 5 μm or less. That is, through adjustment of a thickness of the hardened layer formed by carburizing and quenching, or preparation of a material of the tubular blank, the depth of the abnormal surface layer after the carburizing and quenching treatment can be set to 5 μm or less.

According to the hollow shaft of the present invention, the hollow shaft can be reduced in hardness and imparted with ductility in the softened portion M, and hence regardless of presence/absence of working wrinkles, the static torsional strength and torsional fatigue strength of the hollow shaft can be increased. Further, because the small diameter portion 5 is formed into the softened portion M, the strength of a region most easily deformed can be increased, and hence the strength as the shaft 1 can be stably obtained.

The local heating treatment is carried out by the high-frequency heating treatment, and hence has many advantages. For example, the high-frequency heating treatment has the following advantages: local heating is possible; heating can be performed in a short period of time, and hence produces less oxidation; quenching strain is less as compared to that of another quenching method; surface hardness is high, and the excellent strength is obtained; selection of a depth of the hardened layer is relatively easy; automation is easy and insertion into a machining line is possible; and the like.

The tubular blank has the carbon content of from 0.15% to 0.45%, and hence good plastic workability and even the higher strength can be obtained. When the carbon content is less than 0.15%, necessary hardness of a core portion after the carburizing and quenching treatment cannot be obtained, which leads to a reduction in strength. When the carbon content exceeds 0.45%, plastic workability of the tubular blank is reduced.

The surface carbon concentration (CP value) at the time of the carburizing and quenching treatment is set to 0.50% to 0.70%, and hence a proper hardness distribution at the time of the carburizing and quenching treatment is easily obtained. When the surface carbon concentration (CP value) is less than 0.50%, stable surface hardness cannot be obtained. When the surface carbon concentration (CP value) exceeds 0.70%, a brittle fracture is likely to occur. Here, the brittle fracture is a fracture involving a significant reduction of plastic deformation.

The small diameter portion formed into the softened portion obtained by the local heating treatment has the radially inner surface hardness of from 45 HRC to 55 HRC, and hence the static torsional strength can be ensured. When the radially inner surface hardness is less than 45 HRC, a yield point is low. When the radially inner surface hardness exceeds 55 HRC, working wrinkles and cracks of flaws generated by plastic working are sharpened, which leads to a reduction in strength.

The depth of the abnormal surface layer after the carburizing and quenching treatment is set to 5 μm or less. This does not lead to a reduction in strength, and does not require carrying out grinding or the like for removing the abnormal surface layer after carburizing and quenching, thereby enabling an improvement of productivity and a cost reduction. In contrast, when the depth of the abnormal surface layer exceeds 5 μm, the abnormal surface layer acts as an origin of the fracture, with the result that the strength is reduced.

The local heating treatment is carried out in the liquid. Thus, it is possible to facilitate control of local heating performed on the small diameter portion 5, and to effectively prevent softening of a region, such as the spline 3 adjacent to the small diameter portion 5, which is unnecessary to be subjected to local heating.

When the ratio (Ds/Df) ranges from 1.05 to 1.13, the small diameter portion 5 on the fixed type constant velocity universal joint side is formed as the minimum diameter portion. Accordingly, it is only necessary to carry out local heating only on the minimum diameter portion, which enables a reduction in local heating cost. When the ratio (Ds/Df) is less than 1.05, the small diameter portion 6 on the plunging type constant velocity universal joint side becomes a weakest portion after local heating, which is of no value as a measure. When the ratio (Ds/Df) is more than 1.13, it is difficult to carry out plastic working, which increases manufacturing cost.

By the way, tempering treatment is normally carried out for the carburizing and quenching treatment. Further, according to the present invention, the induction heating as described above is carried out after the carburizing and quenching treatment. Accordingly, instead of carrying out tempering for the above-mentioned carburizing and quenching treatment, tempering may be carried out on an entire or necessary region simultaneously with induction heating performed as the local heating treatment.

If the softened portion M obtained by the local heating treatment is simultaneously formed when carrying out induction tempering as described above, as compared to a step of forming the softened portion by the local heating treatment after carrying out induction tempering, it is possible to shorten an operation time period, improve productivity, and reduce cost.

Figure 7:
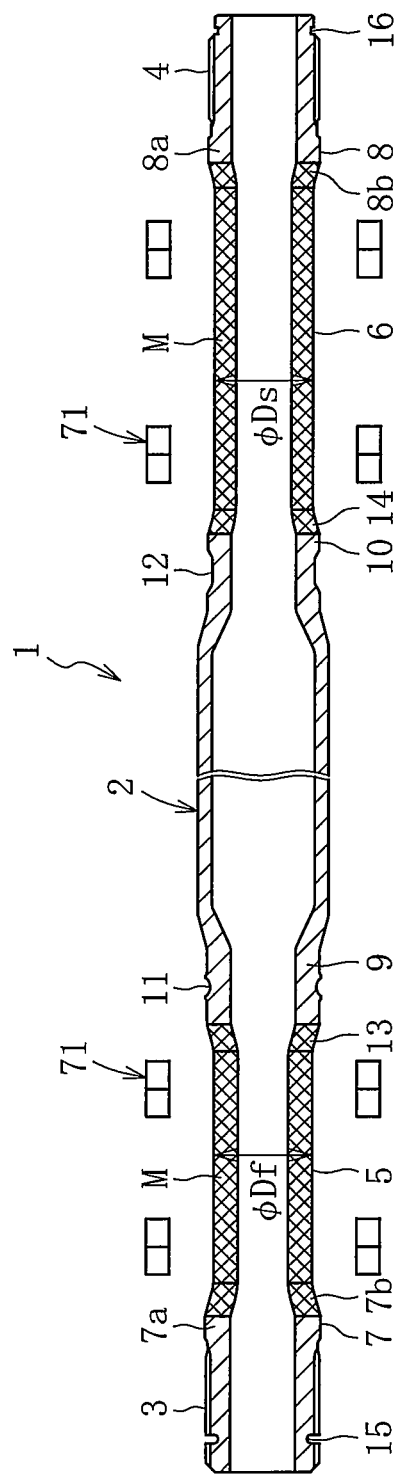
FIG. 7 A cross-sectional view of a hollow shaft according to a second embodiment of the present invention.

As illustrated in FIG. 7, the softened portion M obtained by the local heating treatment maybe formed also in the other small diameter portion 6 (on the plunging type constant velocity universal joint 21 side). Both the small diameter portions 5, 6 are formed into the softened portions M in this manner, and hence the strength of the entire shaft 1 can be obtained stably.

Figure 8:
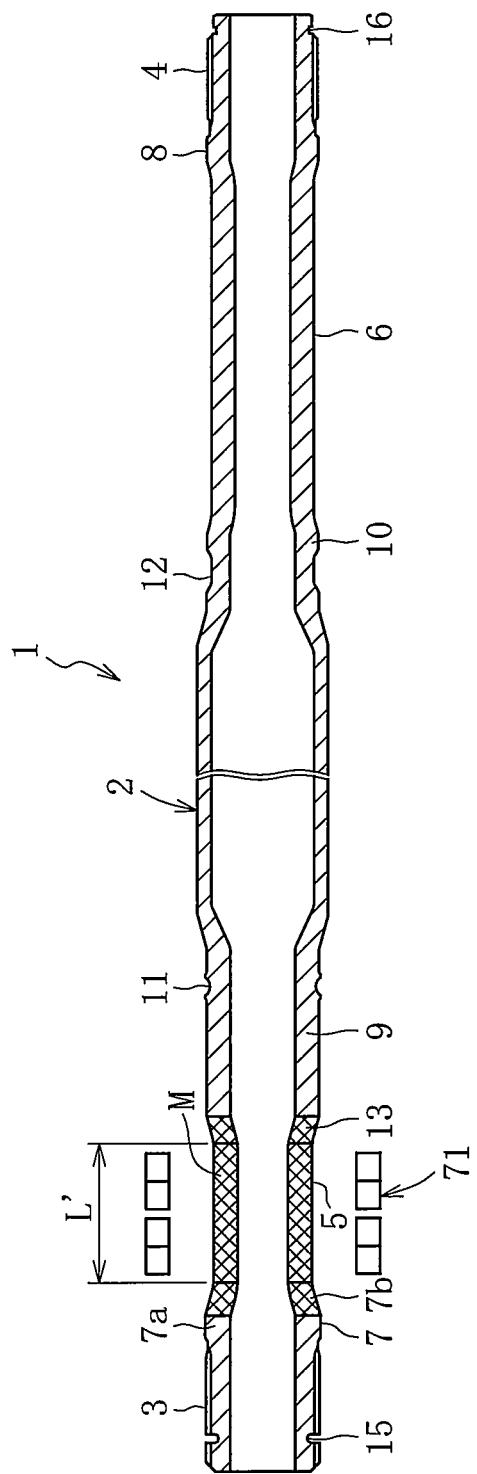
FIG. 8 A cross-sectional view of a hollow shaft according to a third embodiment of the present invention.

As illustrated in FIG. 8, when L' represents an axial length of the minimum diameter portion (small diameter portion 5) on the fixed type constant velocity universal joint 20 side and Lo represents a length of an interference region S of the shaft (see FIG. 3) which interferes with the outer joint member 25 of the fixed type constant velocity universal joint 20 in a state of forming a high operating angle, a ratio (L'/Lo) ranges from 1 to 4. In this case, the axial length L' of the small diameter portion 5 of the shaft 1 is set to be smaller than an axial length L of the small diameter portion 5 illustrated in FIG. 1.

When the ratio (L'/Lo) ranges from 1 to 4, a maximum operating angle as the constant velocity universal joint can be ensured. In addition, a region to be subjected to local heating can be set in a relatively small range, which enables easy control and a cost reduction. When the ratio (L'/Lo)<1, the maximum operating angle as the constant velocity universal joint cannot be ensured. When the ratio (L'/Lo)>4, it is difficult to obtain merits of limitation.

The embodiments of the present invention are described above, but the present invention is not limited to the above-mentioned embodiments and various modifications can be made thereto. For example, plastic working may be carried out under cold working conditions or hot working conditions. It is desired that plastic working be carried out under cold working conditions in view of dimensional accuracy. Further, as the splines formed by component rolling, the number of axial projections and axial recesses of the splines, and the like can be set as appropriate. The axial projections and the axial recesses can be modified into various shapes according to a mating side to which the axial projections or the axial recesses are mounted. Further, as the splining, a process of molding the splines by pushing into a die can be performed. The push-in molding is preferred in view of dimensional accuracy.

INDUSTRIAL APPLICABILITY

The hollow shaft is used for, for example, a drive shaft or a propeller shaft forming a part of a power transmission system of an automobile. The hollow shaft is coupled to a fixed type constant velocity universal joint or a plunging type constant velocity universal joint.

REFERENCE SIGNS LIST

M softened portion
S interference region of shaft
1 hollow shaft
3, 4 spline
5, 6 small diameter portion
20 fixed type constant velocity universal joint
21 plunging type constant velocity universal joint

The invention claimed is:

1. A hollow shaft for power transmission formed by plastic working from a tubular blank, and subjected to quench hardening treatment, the hollow shaft comprising:
   a first male spline formed at a first end portion;
   a second male spline formed at a second end portion;
   a large diameter portion formed between the first male spline and the second male spline; and
   a first small diameter portion formed between the large diameter portion and the first male spline, the first small diameter portion having a diameter smaller than a diameter of the large diameter portion and having a smooth radial outer surface, wherein
   a radial inner surface of the first small diameter portion includes working wrinkles formed by reducing the first small diameter portion in diameter by plastic working,
   a hardened layer portion is formed on a surface of the large diameter portion and surfaces of the first and second male splines by a carbonizing and quenching treatment,
   the first small diameter portion is formed of a softened portion having a hardness lower than a hardness of the hardened layer portion,
   the softened portion is formed by softening the first small diameter portion by local heating treatment subsequent to hardening the first small diameter portion by the carburizing and quenching treatment,
   the softened portion has a radially inner surface hardness of from 45 HRC to 55 HRC,
   the tubular blank has a carbon content of from 0.15% to 0.45% by mass, and
   the hardened layer portion has a surface carbon concentration of from 0.50% to 0.70% by mass.

2. A hollow shaft for power transmission according to claim 1, further comprising a second small diameter portion formed between the second male spline and the large diameter portion, the second small diameter portion having a diameter smaller than the diameter of the large diameter portion and a smooth radial outer surface,
   wherein the second small diameter portion is formed of the softened portion.

3. A hollow shaft for power transmission according to claim 1, wherein the local heating treatment comprises induction heating treatment.

4. A hollow shaft for power transmission according to claim 1, wherein a depth of an abnormal surface layer formed on the hardened layer portion is 5µm or less.

5. A hollow shaft for power transmission according to claim 1, wherein the local heating treatment is induction tempering.

6. A hollow shaft for power transmission according to claim 1, wherein the local heating treatment is carried out in liquid.

7. A hollow shaft for power transmission according to claim 1, wherein the first male spline is coupled to a fixed type constant velocity universal joint having an outer joint member.

8. A hollow shaft for power transmission according to claim 1, wherein
   the first male spline is coupled to a fixed type constant velocity universal joint, and
   the second male spline is coupled to a plunging type constant velocity universal joint.

9. A hollow shaft for power transmission according to claim 8, further comprising a second small diameter portion formed between the large diameter portion and the second male spline, the second small diameter portion having a diameter smaller than the diameter of the large diameter portion and a smooth radial outer surface, wherein, when Ds represents an outer diameter dimension of the second small diameter portion and Df represents an outer diameter dimension of the first small diameter portion, a ratio Ds/Df ranges from 1.05 to 1.13.

10. A hollow shaft for power transmission according to claim 7, wherein a ratio L'/Lo ranges from 1 to 4 when the fixed type constant velocity universal joint is at a maximum operating angle, L' representing an axial length of the first small diameter portion and Lo representing a length of a region or the outer joint member of the fixed type constant velocity universal joint that interferes with the first small diameter portion when the fixed type constant velocity universal joint is at the maximum operating angle.

11. A drive shaft assembly which includes the hollow shaft for power transmission according to claim 1.

12. A hollow shaft for power transmission according to claim 2, wherein the local heating treatment comprises induction heating treatment.

* * * * *